April 27, 1926. 1,582,132
E. DELACUVELLERIE
METHOD OF CONTROLLING THE TEMPERATURE OF CAST GLASS IN THE
MANUFACTURE OF SHEET GLASS BY VERTICAL DRAWING
Filed April 16, 1923
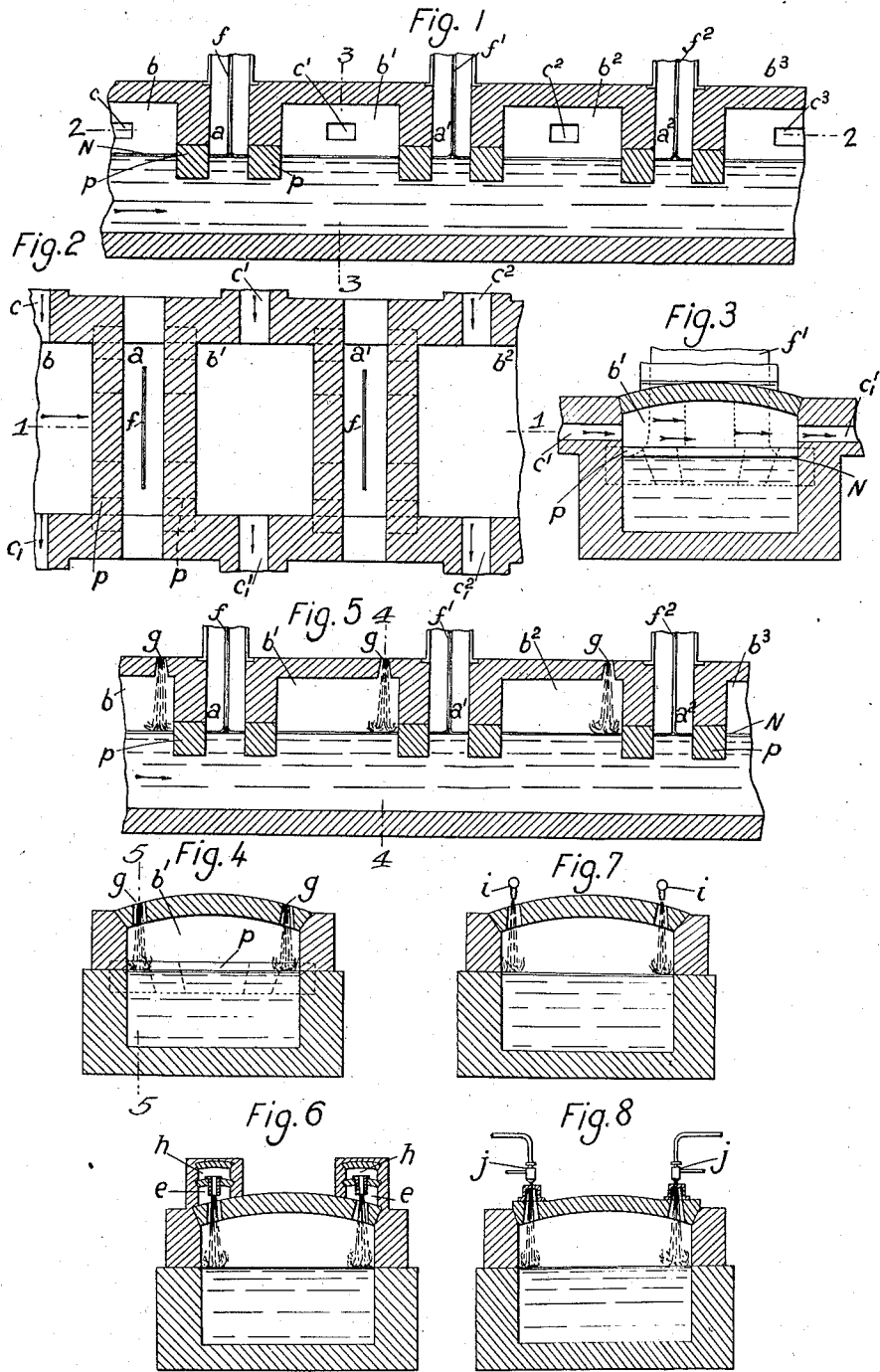
Inventor:
E. Delacuvellerie Patented Apr. 27, 1926.

1,582,132

UNITED STATES PATENT OFFICE.

ERNEST DELACUVELLERIE, OF DAMPREMY, BELGIUM, ASSIGNOR TO THE SOCIÉTÉ ANONYME "BREVETS FOURCAULT," OF DAMPREMY, BELGIUM, A CORPORATION OF BELGIUM.

METHOD OF CONTROLLING THE TEMPERATURE OF CAST GLASS IN THE MANUFACTURE OF SHEET GLASS BY VERTICAL DRAWING.

Application filed April 16, 1923. Serial No. 632,497.

*To all whom it may concern:*

Be it known that I, ERNEST DELACUVELLERIE, subject of the King of Belgium, residing at Dampremy, in Belgium, and having P. O. address Usines de Dampremy, in the said city, have invented certain new and useful Improvements in Methods of Controlling the Temperature of Cast Glass in the Manufacture of Sheet Glass by Vertical Drawing; and I do hereby declare the following to be a full, clear, and exact description of the invention, such as will enable others skilled in the art to which it appertains to make and use the same.

The present invention relates to a method of manufacture of sheet glass by vertical drawing and its object essentially consists in providing and supplying to the nascent sheet of glass a layer of molten glass of a regular temperature throughout its width or variable at will from the middle to the sides of the said sheet.

As is known in this manufacture it is usual to create by means of bridges immersed in the glass, fluid tight working spaces for the cast glass in which the drawing operation is effected. Different machines are successively situated above a common passage or conduit from whence the liquid glass is delivered to the said working spaces. These working spaces are separated by chambers in which the glass is reheated to the desired temperature so that it may be readily manipulated at the succeeding or following apparatus.

The object of the present invention consists essentially in increasing the temperature of the currents of glass circulating along the walls of the furnaces above that which they would normally have by reason of the heating means usually employed.

The accompanying drawing illustrates in Figures 1 to 3 the ordinary construction of glass furnaces while Figures 4 to 8 illustrate the applicant's improvements.

In the drawing:

Figure 1 is a longitudinal sectional view on the line 1—1 of Fig. 2.

Figure 2 is a section on the line 2—2 of Fig. 1.

Figure 3 is a section on the line 3—3 of Fig. 1.

Figure 4 is a section on the line 4—4 of Fig. 5 of a furnace constructed in accordance with the invention.

Figure 5 is a longitudinal section on the line 5—5 of Fig. 4.

Figures 6, 7 and 8 are vertical sectional views similar to Fig. 4 illustrating several modifications of the invention.

In Figures 1, 2 and 3 of the drawings, $a$, $a^1$, $a^2$ are the working spaces in which the molten glass, the level of which is indicated at N, is converted into sheets $f$, $f^1$, $f^2$ (seen in the two edge projections).

The chambers $b$, $b^1$, $b^2$ are the reheating chambers and $p$, $p$ the bridge pieces. The working of an installation of this class may be summarized as follows:

The liquid glass from the melting furnace (situated to the left of Figure 1) flows from the chamber $b$, where it is suitably reheated, into the working space $a$ where a part of it is worked into a sheet $f$. From thence fused glass, but slightly cooled, flows under the second bridge piece $p$ situated between $a$ and $b^1$ and finally reaches the chamber $b^1$. Therein it undergoes reheating which is intended to render it more suitable for working in the working space $a^1$ from whence it flows under a further bridge piece, and so on.

One of the most important points in the manufacture of sheet glass is to obtain perfect uniformity of temperature of the glass throughout the length of the part which is to be converted into a sheet; the apparatus and furnaces ordinarily employed do not give that result.

In fact in its travel from one end to the other of the passage indicated in Figures 1, 2 and 3 a part of the glass circulates at the centre and another part along the walls. These two currents must necessarily have different temperatures. The walls exert less cooling action on the current adjacent to the centre.

The currents adjacent to the wall are, however, subjected to a strong cooling action.

The reheating of the glass in the chambers $b$, $b^1$, $b^2$ etc., is ineffectual from the point of view of avoiding this difference in temperature. The chambers are in fact heated by a gas flame which enters through the openings $c$, $c^1$, $c^2$, $c^3$ and escapes through the openings $c_1$, $c^1{}_1$, $c^2{}_1$, $c^3{}_1$, which are provided in the opposite wall of the furnace (heating system either recuperative or regenerative).

It is obvious that in a similar system of heating, there is a tendency for the maximum temperature to develop near the middle of the travel of the flame, possibly near the middle of the chambers $b$, $b^1$, $b^2$.

This reheating is therefore ineffectual to compensate for the difference of temperature which exists between the central current of glass and those adjacent the walls of the furnace.

For these two reasons first more energetic cooling and, second, less reheating, the sheet or layer of cast glass which circulates along the walls of the furnace is at a lower temperature than the central sheet or layer of glass.

Now, it is these lateral or side currents of glass which obviously (Figures 2 and 3) provide the glass for the edge or marginal portions of the glass sheet when forming the glass into a sheet, and the central current provided the glass for the middle of the glass sheet during working.

It follows therefrom that the sheet is formed by layers of glass at different temperature which is particularly unfavorable to the production of uniform and thoroughly annealed sheets.

In Figures 4 and 5 wherein the present invention is illustrated, a vertical or approximately vertical flame is projected through the roof of the furnace onto a limited area of the glass, the opening through which the flame is projected being situated one each in the reheating chambers and in the two angles formed by the walls of the furnace and the feed bridge $p$—that is to say the bridge-piece under which the molten glass flows in order to enter the chamber $a$, $a^1$, $a^2$. The openings in the roof through which the flame is projected are indicated at $g$ in Figures 4 and 5. The effect of these flames will be readily understood. They strike the currents circulating along the walls only without reaching the central current.

According to the intensity of the heat of the flame, the lateral or side currents are more or less reheated and an amount of heat in excess of that of the central current can be imparted to them as desired. This excess of heat may be such that, on taking into account the subsequent loss of heat while circulating under the bridge-piece and along the walls in the working space, these currents of glass shall have at the working space a temperature which is equal to that of the central current, that is to say, in the most favourable condition as regards uniformity of temperature.

The vertical flames may be obtained by various means.

If poor gas be used, there would be very little advantage in using regenerative chambers for the burners. In fact the use of these chambers requires reversal of the air and gas currents, consequently the two burners of one and the same reheating chamber only function alternately which would give only imperfectly the desired result.

It is therefore preferable to use a recuperator and to construct a small burner of the kind such as shewn in Figure 6. Obviously the arrangements may be varied to suit requirements.

It is clear that the admission of air at $e$ and of gas at $h$ ought to be controlled and regulated by dampers provided for that purpose.

If rich gas can be used such as that of coke furnaces, natural gas or petrol gas, the problem is greatly simplified in that the gas if so desired can be employed without hot air, the air necessary for combustion being supplied from the atmosphere.

In this case an arrangement such as shown in Figure 7 may be used where the gas is admitted at $i$.

A combustible derived from either petrol or tar, may be successfully employed by means of a burner $j$ constructed and adapted for this purpose and using atmospheric air as shewn in Figure 8.

Claims:

1. The method of controlling the temperature of molten glass in the manufacture of sheet glass in glass drawing furnaces consisting in applying heat locally to the portions of the body of molten glass lying contiguous to the walls of the furnace before the glass reaches the drawing chamber of the furnace whereby to maintain the entire mass of molten glass at a uniform temperature during drawing operation.

2. A glass drawing furnace including side walls, a chamber for the flow of molten glass between the walls, a drawing chamber and means for supplying heat to the portions of the molten glass lying contiguous to the furnace walls whereby to heat the molten glass before it reaches the drawing chamber and to maintain the entire mass of molten glass passing through the chamber at a uniform temperature.

3. In a glass furnace, side walls, a chamber between the side walls for the flow of molten glass, a drawing chamber, and gas burners located in the furnace and arranged to direct a flame upon the portions of the molten glass lying contiguous to the side walls whereby to heat the molten glass before it reaches the drawing chamber and to maintain the entire mass of molten glass throughout a uniform temperature.

In testimony whereof I have signed my name to this specification.

ERNEST DELACUVELLERIE.